(12) United States Patent
Kirchhoff

(10) Patent No.: US 9,643,798 B2
(45) Date of Patent: May 9, 2017

(54) METHOD AND DEVICE FOR CONVEYING GOODS TO BE CONVEYED WITH A CELLULAR WHEEL SLUICE

(71) Applicant: KRONES AG, Neutraubling (DE)

(72) Inventor: Timm Kirchhoff, Westerholz (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 15/272,931

(22) Filed: Sep. 22, 2016

(65) Prior Publication Data

US 2017/0008708 A1 Jan. 12, 2017

Related U.S. Application Data

(62) Division of application No. 13/940,480, filed on Jul. 12, 2013.

(30) Foreign Application Priority Data

Aug. 9, 2012 (DE) .................. 10 2012 214 185

(51) Int. Cl.
- B65G 53/00 (2006.01)
- B65G 53/34 (2006.01)
- G01F 11/24 (2006.01)
- B65G 53/46 (2006.01)

(52) U.S. Cl.
CPC ......... B65G 53/34 (2013.01); B65G 53/4633 (2013.01); G01F 11/24 (2013.01)

(58) Field of Classification Search
CPC .... B65D 65/20; B65G 29/02; B65G 53/4622; B65G 65/48; B65G 65/4827; B65G 65/4881

USPC ... 406/52, 69, 100, 101, 102, 103, 104, 197; 198/550.12, 550.8
See application file for complete search history.

(56) References Cited

U.S. PATENT DOCUMENTS

| 425,338 A | 4/1890 | G-eobge Mullee |
| 715,306 A * | 12/1902 | Sharpneck .......... A01F 25/2009 |
| | | 406/169 |
| 1,264,575 A | 4/1918 | Stukenborg |
| 1,557,106 A | 10/1925 | Tow et al. |

(Continued)

FOREIGN PATENT DOCUMENTS

| CH | 675573 A5 | 10/1990 |
| DE | 1953584 U | 1/1967 |

(Continued)

OTHER PUBLICATIONS

European Search Report for Application No. 13171485.9 dated Nov. 18, 2013.

(Continued)

*Primary Examiner* — Joseph Dillon, Jr.
(74) *Attorney, Agent, or Firm* — Marshall, Gerstein & Borun LLP

(57) ABSTRACT

A method for conveying goods to be conveyed with a cellular wheel sluice, wherein in a housing, the goods to be conveyed are conveyed with rotor blades of the rotating cellular wheel, and sealing lips of the rotor blades abut against at least one sealing surface of the housing. During the transport of certain goods to be conveyed, such a sealing surface and/or sealing lips can be used which are formed from an abrasive material that is contained in the goods to be conveyed.

6 Claims, 3 Drawing Sheets

(56) References Cited

U.S. PATENT DOCUMENTS

| | | | | |
|---|---|---|---|---|
| 2,102,619 | A | * 12/1937 | Francis | F23K 3/00 |
| | | | | 222/239 |
| 2,323,786 | A | 7/1943 | Beisel | |
| 2,632,399 | A | * 3/1953 | Hyre | F01C 21/007 |
| | | | | 198/642 |
| 2,760,298 | A | * 8/1956 | Trier | A01M 9/0092 |
| | | | | 222/160 |
| 2,829,925 | A | * 4/1958 | Monteil | B65G 53/58 |
| | | | | 406/100 |
| 3,261,453 | A | 7/1966 | Hirs | |
| 3,294,454 | A | * 12/1966 | Foerster | F01C 21/0836 |
| | | | | 406/102 |
| 3,703,967 | A | 11/1972 | Gessler | |
| 3,833,134 | A | 9/1974 | Gessler | |
| 3,968,997 | A | * 7/1976 | Mast | A01D 87/10 |
| | | | | 406/100 |
| 4,072,253 | A | 2/1978 | Walters, Jr. | |
| 4,425,058 | A | * 1/1984 | Sorensen | B65G 53/28 |
| | | | | 406/100 |
| 4,502,590 | A | * 3/1985 | Pole | B65G 29/02 |
| | | | | 198/611 |
| 4,696,432 | A | * 9/1987 | Russ | A01D 43/086 |
| | | | | 241/101.742 |
| 4,764,057 | A | 8/1988 | Molter et al. | |
| 4,930,944 | A | * 6/1990 | VanGinhoven | B65G 53/28 |
| | | | | 406/103 |
| 5,037,014 | A | * 8/1991 | Bliss | B65G 65/4881 |
| | | | | 222/368 |
| 5,529,247 | A | 6/1996 | Mleczewski | |
| 5,931,610 | A | 8/1999 | Rixom et al. | |
| 5,997,220 | A | 12/1999 | Wormser | |
| 7,021,455 | B2 | 4/2006 | Nemedi | |
| 7,597,219 | B2 | 10/2009 | O'Leary et al. | |
| 9,073,711 | B2 | 7/2015 | Savarese et al. | |
| 2004/0065857 | A1 | 4/2004 | Cheng | |
| 2005/0098586 | A1 | * 5/2005 | Jensen | B65G 53/4633 |
| | | | | 222/367 |
| 2007/0138211 | A1 | 6/2007 | O'Leary et al. | |
| 2012/0233874 | A1 | * 9/2012 | Savarese | B65G 65/4881 |
| | | | | 34/236 |
| 2012/0234735 | A1 | * 9/2012 | Ichikawa | B07B 1/06 |
| | | | | 209/255 |
| 2014/0044495 | A1 | 2/2014 | Kirchhoff | |
| 2015/0284189 | A1 | 10/2015 | Savarese et al. | |

FOREIGN PATENT DOCUMENTS

| | | |
|---|---|---|
| DE | 6809568 U | 4/1969 |
| DE | 1926915 A1 | 1/1970 |
| DE | 2004666 A1 | 8/1971 |
| DE | 20316310 U1 | 5/2004 |
| GB | 948109 A | 1/1964 |

OTHER PUBLICATIONS

German Search Report for Application No. 102012214185.5, dated Jun. 10, 2013.
English Translation of Chinese Office Action for Application No. 201310339670, dated Apr. 3, 2015.

* cited by examiner

METHOD AND DEVICE FOR CONVEYING GOODS TO BE CONVEYED WITH A CELLULAR WHEEL SLUICE

The present application is a divisional of U.S. patent application Ser. No. 13/940,480, filed Jul. 12, 2013, which claims priority of German Application No. DE 102012214185.5, filed Aug. 9, 2012. The entire text of each of the priority applications U.S. Ser. No. 13/940,480 and DE 102012214185.5 is hereby incorporated by reference.

FIELD OF THE DISCLOSURE

The invention relates to a method and a device for conveying goods to be conveyed with a cellular wheel sluice.

BACKGROUND

Cellular wheel sluices are usually employed for dosing goods to be conveyed or for introducing and discharging them into or out of bulk processes. The cellular wheel sluices can be installed e. g. in recycling plants, silos, bunkers or hoppers, mixers, driers, mills or in conveyor lines and are mainly used for the separation from machines or processes with different pressure ranges and for volumetric dosing.

In such methods, the goods to be conveyed are transported in a housing by rotor blades of the rotating cellular wheel, the rotor blades forming rotor cells in the process by which the goods to be conveyed are moved further. The cellular wheel is manufactured to mate the housing such that the exacting tolerances between the cellular wheel and the housing and/or sealings prevent pressure compensation or a passage between the inlet and outlet openings of the sluice. While rotating, each rotor cell of the cellular wheel receives the goods to be conveyed at the inlet opening and discharges it again at the outlet opening. The discharge is here essentially determined by the volume of the cells and the speed of the rotating cellular wheel.

For sealing the rotating cellular wheel from the housing, sealing lips at the rotor blades and/or at least one sealing surface at the housing of a sealing material, such as ethylene-propylene-diene rubber, polyvinyl chloride, polytetrafluoroethylene, polyester urethane rubber, silicone, fluorosilicone, are usually employed. These sealing materials have different Shore hardnesses and can comprise an elastomer plastic and/or thermoplastic. Sealing lips can be designed with a textile insert and/or a coating. By the flexibility of the sealing materials, sealing towards the housing can be ensured during the rotation of the cellular wheel, in particular to compensate any unevenness of the sealing lips and/or the sealing surface. Thus, a passage of the goods to be conveyed or a gas in the direction of flow or counterflow is prevented.

Here, one disadvantage is that by the friction of the sealing lips with the sealing surfaces, abraded particles can form which contaminate the goods to be conveyed, thus impairing the quality of the further processed goods to be conveyed.

SUMMARY OF THE DISCLOSURE

It is the object of the invention to provide a method and a device that prevent a reduction of the quality of the goods to be conveyed by the abraded particles from the sealing mechanism.

The invention achieves this object in a method for conveying goods to be conveyed with a cellular wheel sluice having the features of the preamble of claim 1 with the features of the characterizing part according to which during the transport of certain goods to be conveyed such a sealing surface and/or such sealing lips are used which are made of an abrasive material that is contained in the goods to be conveyed.

By the abrasive material of the employed sealing surface and/or sealing lips corresponding to the material contained in the goods to be conveyed, only abraded particles from material that is also contained in the goods to be conveyed are formed by the friction of the sealing lips on the sealing surface, and thus the goods to be conveyed are not contaminated by foreign matter. Moreover, the abraded particles can no longer be detected in the goods to be conveyed after they have passed the cellular wheel sluice. When the goods to be conveyed are melted, for example, the formed abraded particles behave in such a way that the melt consists of the homogenous desired goods to be conveyed. Thus, no inclusions of foreign matter that impair the quality are formed in the later product.

In other words, sealing lips of an abrasive material that is contained in the goods to be conveyed can be employed at the rotor blades. The fact that the sealing lips of the rotor blades abut against at least one sealing surface of the housing can mean that the sealing lips abut against the sealing surface over the complete or over a portion of the surface, and that in particular a gap is formed between the partial surfaces. The sealing lips can be in contact with the sealing surface of the housing. A material can be used for the sealing surface of the housing which is harder than the material of the sealing lips. Thereby, the abraded particles are formed in the region of the sealing lips.

Equally, an abrasive material can be used for the at least one sealing surface of the housing which is contained in the goods to be conveyed, where in particular for the sealing lips of the rotor blades, a material is used which is harder than the material of the sealing surface. Thereby, the abraded particles are formed in the region of the sealing surface.

The method for conveying goods to be conveyed can be provided for conveying and/or dosing goods to be conveyed, and/or for sealing at least two process sections with respect to each other.

The sealing lips can be exchanged, in particular if they are adapted to a certain material in the goods to be conveyed. Equally, the rotor blades of the cellular wheel or the complete cellular wheel can be exchanged.

Abrasive material can mean that abraded particles are formed by the movement of the sealing lips along the sealing surfaces. The abraded particles can in particular comprise particles of the abrasive material.

As the abrasive material of the sealing surface and/or the sealing lips, polyethylene, polypropylene, polystyrene, polymethylmethacrylate, polyamides, polyester (polycarbonate and polyethylene terephthalate), polyethylene glycol, polyoxymethylene, star polymers, polyester urethane rubber, silicone and/or fluorosilicone can be preferably used. As the abrasive material of the sealing surface and/or the sealing lips, a thermoplastic can be in particular chosen. Thereby, the thermoplastics are not contaminated when they are recycled.

As the sealing lips, a lamellar or bristle structure can be preferably used. Thereby, a stiff material can also be brought into a shape which easily deforms, similar to a soft solid material, and thus good sealing can be achieved with such a material.

According to a variant of the invention, packs of foil elements of an abrasive material can be in particular used as sealing lips. The sealing lips designed as packs of foil elements can be used in connection with the above mentioned invention or independently of it. Thereby, the sealing lips can have a particularly simple design. The foil elements can be made, according to the characterizing part of claim 1, of an abrasive material that is contained in the goods to be conveyed. The pack of foil elements can comprise a number of foils within a range of 2 to 100, in particular within a range of 10 to 30 foils. The rotor blades can be embodied as clamping elements between which the foil elements are clamped. The clamping elements can in particular be clamped with at least one bolt. In particular, foil elements can be used that are longer than the gap between the rotor blades and the sealing surface. Thereby, the foil elements are somewhat bent, thus exerting some pressure onto the sealing surface. The abrasive material of the foil elements can comprise a material according to claim 2. Equally, the foil elements can be designed with a lamellar or bristle structure according to claim 3.

In the method, in particular edges of the foil elements can slide along the sealing surface. As an alternative, the edges of the foil elements can slide along the sealing surface perpendicularly to the direction of motion of the rotor blades.

In the method, sealing lips can be used in which an elastic core material is provided with a coating of the abrasive material. Equally, sealing lips can be used which are formed of the abrasive material in a tubular manner.

The invention furthermore provides a cellular wheel sluice for carrying out the method according to which the cellular wheel sluice comprises a housing with at least one sealing surface and a cellular wheel rotatably arranged therein, the cellular wheel comprising several rotor blades with sealing lips abutting against the sealing surface for sealing purposes, characterized in that, depending on the goods to be conveyed, the cellular wheel sluice is provided with sealing lips and/or at least one sealing surface which is formed of a material that is contained in the goods to be conveyed.

By the sealing lips abutting against the sealing surface for sealing and moving against each other by the rotating cellular wheel, abraded particles of the material of the sealing lips and/or the sealing surface are formed. These abraded particles get into the goods to be conveyed, and as the goods to be conveyed already contain the same material, the goods to be conveyed are thus not contaminated by foreign matter. Thus, the goods to be conveyed are not contaminated, and the quality is thus not affected.

The cellular wheel sluice for conveying goods to be conveyed can be in particular used for carrying out the above-described method.

The sealing surface and/or the sealing lips can comprise a material of polyethylene, polypropylene, polystyrene, polymethylmethacrylate, polyamides, polyester (polycarbonate and polyethylene terephthalate), polyethylene glycol, polyoxymethylene, star polymers, polyester urethane rubber, silicone and/or fluorosilicone. Thereby, in particular in recycling processes, a contamination of the recycled material can be prevented.

The sealing lips can comprise a lamellar and/or a bristle structure. This can increase the flexibility of the sealing lips and thus improve sealing. The lamellar and/or bristle structure can be designed such that it is longer than the gap between the rotor blades and the sealing surface. In particular, the lamellar and/or bristle structure can be pretensioned such that they are slightly bent when abutting against the sealing surface. Thereby, an unevenness of the sealing surface by a change of bent of the lamellar and/or bristle structure can be compensated.

According to a variant of the invention, the sealing lips can comprise packs of foil elements. The sealing lips designed as packs of foil elements can be used in connection with the above mentioned invention or independently of it. The foil elements can be made of an abrasive material that is contained in the goods to be conveyed. Thereby, one can achieve an elastic form of the sealing lips, in particular if the material contained in the goods to be conveyed is of high stiffness. The packs of foil elements can be clamped each between clamping elements. The clamping elements can in particular be embodied such that the clamping force is applied by at least one bolt. The foil elements of one pack can have the same size. The foil elements can be embodied to be longer than the gap between the rotor blades and the sealing surface and be in particular pretensioned such that they include a bent. Thereby, any unevenness of the sealing lips and the sealing surface is better compensated, and a higher sealing effect is achieved. The foil elements can be designed with a lamellar or bristle structure.

The foil elements can be arranged perpendicularly to the direction of motion of the rotor blades.

The ends of the foil elements and the sealing surface can include an angle within a range of 45° to 90°, or preferably within a range of 80° to 90°. By this arrangement of the foil elements relative to the sealing surface, a preferably high force of the foil elements will be exerted onto the sealing surface, and thus a high sealing effect will be achieved. In other words, the foil elements preferably abut against the sealing surface perpendicularly. Thereby, the cellular wheel sluice cannot only be used for conveying, but also for sealing process machines and containers, and for dosing bulk goods.

The foil elements can have a thickness within a range of 50 µm to 500 µm, or in particular within a range of 190 µm to 350 µm.

The sealing surface can be arranged such that it at least partially encloses the cellular wheel. Thereby, the sealing lips extend at the outer regions of the rotor blades and have a particularly simple shape. In other words, the sealing surface can have a cylindrical or a conic shape. In particular, the cellular wheel can be arranged to rotate within the sealing surface.

The sealing lips can be mounted to the rotor blades to be exchangeable. The rotor blades can also be mounted to the cellular wheel to be exchangeable. Thereby, the material of the sealing lips can be easily adapted to the respective goods to be conveyed.

The method and/or the cellular wheel sluice can in particular comprise one or several ones of the above-described features.

BRIEF DESCRIPTION OF THE DRAWINGS

Further features and advantages of the invention will be illustrated below with reference to the exemplary figures. In the drawings:

FIG. 2b shows a detailed view of a rotor blade with a sealing lip of the cellular wheel sluice represented in FIG. 2a.

DETAILED DESCRIPTION OF THE PREFERRED EMBODIMENT

Figure 1:
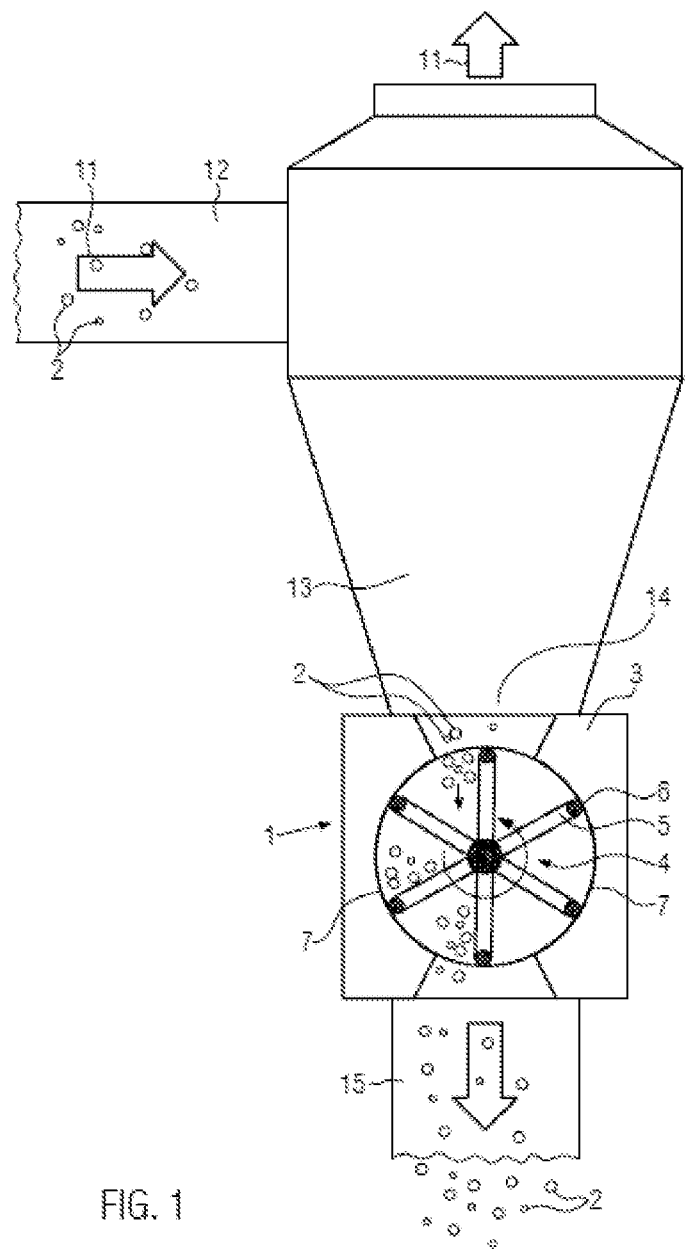
FIG. 1 shows a representation of a cellular wheel sluice according to the invention for conveying goods to be conveyed in a lateral view.

FIG. 1 shows a cellular wheel sluice 1 according to the invention for conveying goods to be conveyed 2 in a lateral view. One can see a cyclone 13 in which a mixture of goods to be conveyed 2 and a carrier gas 11 are being separated, and the goods to be conveyed 2 are then further transported from an inlet opening 14 to an outlet opening 15 in the cellular wheel sluice 1. Here, the pressure is higher in the region of the inlet opening 14 than in the region of the outlet opening 15. The goods to be conveyed 2 are here, for example, polyethylene.

The goods to be conveyed 2 get into the inlet 12 of the cyclone 13 together with the carrier gas 11. Here, the carrier gas 11 has such a high flow rate that the goods to be conveyed 2 are transported through a preceding pipeline system (not represented here) and the inlet 12. Due to the high flow rate of the carrier gas 11, a swirl under high pressure forms in the cyclone 13, where the flow rate in the tapering portion of the cyclone 13 is increasing towards the bottom, so that the goods to be conveyed 2 are separated from the carrier gas 11 by means of the centrifugal forces acting on the goods to be conveyed 2. In the cyclone 13, the carrier gas 11 thus escapes to the top, and the goods to be conveyed 2 will get to the inlet opening 14 of the cellular wheel sluice 1 towards the bottom.

Underneath the cyclone 13, a cellular wheel sluice 1 is arranged for achieving the discharge of the goods to be conveyed 2 into the following units with a preferably low pressure loss in the cyclone 13. If a counterflow is formed in the cyclone 13, the separation of the goods to be conveyed 2 from the carrier gas 11 will deteriorate. Thus, losses of goods to be conveyed 2 via the separation of the carrier gas 11 to the top and out of the cyclone 13 will occur.

To avoid such a pressure loss through the cellular wheel sluice 1, the rotor blades 5 are designed with sealing lips 6, so that the rotating cellular wheel 4 abuts with a form fit against the sealing surfaces 7 of the housing 3. The sealing lips 6 are under pretension, so that any unevenness of the sealing surfaces 7 caused by tolerances can be compensated by a corresponding deformation of the sealing lips 6. Simultaneously, the friction between the sealing lips 6 and the sealing surfaces 7 is selected such that a power plant not represented here can drive the cellular wheel 4.

By the friction between the sealing lips 6 and the sealing surfaces 7, abraded particles form which mainly consist of the softer material of the two materials involved in friction. In the represented cellular wheel sluice 1 according to the invention, the sealing lips 6 and the goods to be conveyed 2 consist of polyethylene. Simultaneously, the sealing surfaces 7 consist of an alloy steel. The sealing lips 6 are thus formed of a softer abrasive material which is in particular located in the direct contact region of the sealing lips 6 and the sealing surface 7. In the shown cellular wheel sluice 1, thus mainly the material of the sealing lips 6 is abraded and will reach, together with the goods to be conveyed 2, further processing units (not represented here) via the outlet opening 15. The sealing lips 6 are designed to be exchangeable to adapt them to the goods to be conveyed 2.

Since both the material of the sealing lips 6 and the material of the goods to be conveyed is polyethylene, the abraded particles of the sealing lips 6 can be easily also processed in further process steps without any deterioration of the quality of the goods to be conveyed 2 or the products made from them.

In an alternative embodiment, the abrasive material of the sealing surface 7 can be contained in the goods to be conveyed 2, and the sealing lips 6 can be of a harder material than the sealing surfaces 7. For example, the sealing surfaces 7 can be made of the abrasive material as a housing insert (not represented here) which can be removed from the housing 3. Thus, the abraded particles are formed on the side of the sealing surface 7 and will also get into the goods to be conveyed 2 from there. As in this case, however, the abraded particles also consist of the same material as the goods to be conveyed 2, the goods to be conveyed 2 are neither contaminated by foreign matter here.

The goods to be conveyed 2 subsequently reach further process steps, where, for example, granules for injection-molding systems are generated.

Figure 2A:
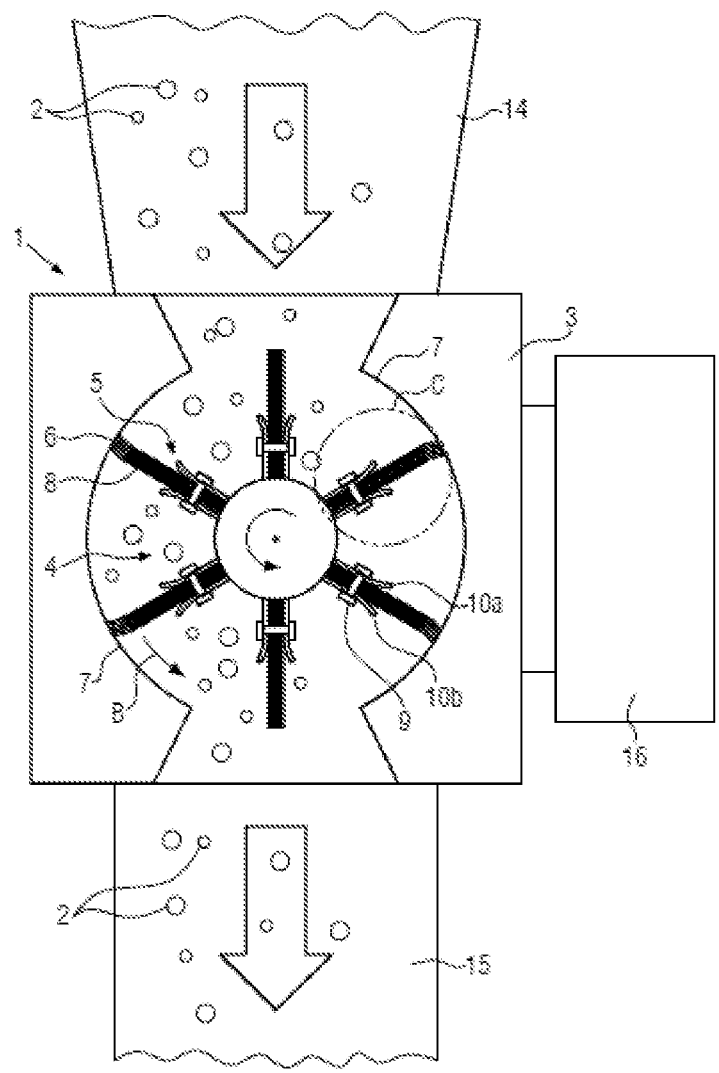
FIG. 2*a* shows a representation of a further embodiment of a cellular wheel sluice according to the invention for conveying goods to be conveyed in a lateral view.
Figure 2B:
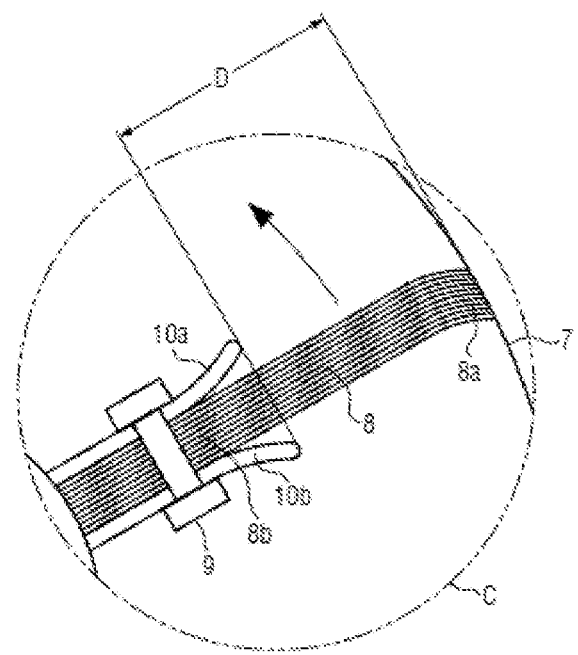

FIGS. 2a and 2b show a representation of a further embodiment of a cellular wheel sluice 1 according to the invention for conveying goods to be conveyed 2 in a side view. Here, FIG. 2b shows a detail C of FIG. 2a. One can see a cellular wheel sluice 1 where goods to be conveyed 2 get to the cellular wheel 4 rotating in a housing 3 via an inlet opening 14 and are further transported from there to the outlet opening 15. The cellular wheel 4 is driven by a power plant 16 designed as an electric motor. Via a transmission not represented here, the motive power of the power plant 16 is transmitted to the cellular wheel 4.

The interior of the housing 3 here has a cylindrical shape in which the cellular wheel 4 can rotate. The cellular wheel 4 has six rotor blades 5 which are provided with sealing lips 6 which seal the rotor blades 5 with respect to the cylindrical sealing surface 7. Thus, the cylindrical sealing surface 7 encloses the cellular wheel 4.

The sealing lips 6 of the rotor blades 5 are here designed as packs of foil elements 8, where the foil elements 8 are clamped between two clamping elements 10a and 10b by means of a bolt 9. Clamping can also be done with several bolts. Clamping by the clamping elements 10a and 10b is accomplished at the clamping end 8b of the foil elements 8. All foil elements 8 are here of the same shape. Here, the clamping elements 10a and 10b form the rotor blade 5, and the projecting foil elements 8 form the sealing lips 6. Between the sealing surface 7 and the rotor blades 5, thus a distance D is formed in the region of which the foil elements 8 are not supported transversely to their surfaces and in the direction of motion of the cellular wheel 4. Thus, the foil elements 8 bent at the outer end 8a against the direction of motion of the cellular wheel 4. The outer ends 8a of the foil elements 8 include an angle of 85° with the sealing surface 7. Thus, the foil elements 8 are pretensioned and exert a force onto the sealing surface 7, so that any unevenness can be easily compensated. The pack consists of 20 polyethylene foil elements 8 of a thickness of 250 µm each. Thus, an optimal sealing effect can be achieved.

During the rotation of the cellular wheel 4, friction occurs, and thus corresponding abraded particles are formed by the friction between the foil elements 8 and the sealing surfaces 7. The abraded particles mainly consist of polyethylene since the foil elements 8 are made of this material and thus are softer than the sealing surfaces 7 made of steel. Since, however, the abraded particles and the goods to be conveyed 2 consist of the same material, here the goods to be conveyed 2 are neither contaminated. Thus, the abraded particles here neither deteriorate the quality of the goods to be conveyed 2.

The foil elements 8 and therefore the sealing lips 6 are designed to be exchangeable in the representation. Thus, the sealing lips 6 can be adapted corresponding to the goods to be conveyed 2 such that they consist of the same abrasive material.

The sealing lips 6 of packs of foil elements 8 shown in FIGS. 2*a* and 2*b* can also be employed in any form of cellular wheel sluice 1 as the foil elements 8 are of particularly high flexibility and thus have a sealing effect. In particular, the material of the foil elements 8 can also be selected independently of the goods to be conveyed 2.

It will be understood that features mentioned in the above described embodiments are not restricted to these special combinations and are also possible in any other combinations.

I claim:

1. A method of conveying goods to be conveyed with a cellular wheel sluice, comprising:
    rotating a cellular wheel having a plurality of rotor blades in a housing, wherein the plurality of rotor blades include a plurality of sealing lips that abut against at least one sealing surface of the housing;
    conveying goods to be conveyed by way of the plurality of rotor blades of the rotating cellular wheel;
    selectively exchanging at least one of a complete cellular wheel, the plurality of rotor blades of the cellular wheel, the plurality of sealing lips, and the sealing surface of the housing such that at least one of the plurality of sealing lips and the sealing surface are made of an abrasive material that is contained in the conveyed goods; and
    during the conveying of goods to be conveyed, forming abrading particles via friction between the sealing lips and the sealing surface, the abrading particles being made from the abrasive material that is contained in the conveyed goods.

2. The method of conveying goods according to claim 1, wherein as an abrasive material of the sealing surface or of the sealing lips using one of polyethylene, polypropylene, polystyrene, polymethylmethacrylate, polyamides, polyester (polycarbonate and polyethylene terephthalate), polyethylene glycol, polyoxymethylene, star polymers, polyester urethane rubber, silicone, fluorosilicone, and a combination thereof.

3. The method of conveying goods according to claim 1, and as the sealing lips, using a lamellar or bristle structure.

4. The method of conveying goods according to claim 1, where as the sealing lips, using packs of foil elements of an abrasive material.

5. The method of conveying goods according to claim 4, wherein edges of the foil elements slide along the sealing surface.

6. The method of conveying goods according to claim 4, wherein edges of the foil elements slide along the sealing surface perpendicularly to the direction of motion of the rotor blades.

* * * * *